United States Patent Office 3,488,735
Patented Jan. 6, 1970

3,488,735
TRIFLUOROGUANYLISOCYANATE DERIVATIVES
Lawrence Elnathan Benjamin, Stamford, Conn., assignor to American Cyanamid Company, Stamford, Conn., a corporation of Maine
No Drawing. Filed Nov. 18, 1966, Ser. No. 595,542
Int. Cl. C07c *69/62, 69/00, 67/00*
U.S. Cl. 260—479    5 Claims

ABSTRACT OF THE DISCLOSURE

The novel compounds of the present invention are represented by the formula (I)  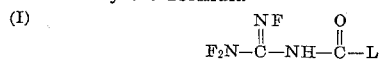

wherein L is an OR radical, an $NH_2$ radical, an $NHR_1$ radical, an $NR_2R_3$ radical, an

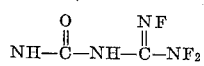

radical, an

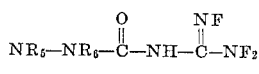

radical, an

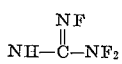

radical, an

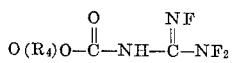

radical or an

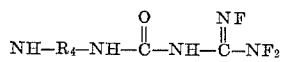

radical wherein R, $R_1$, $R_2$ and $R_3$ are, individually, an alkyl, or an aryl radical, $R_4$ is an alkylene or arylene radical and $R_5$ and $R_6$ are, individually, hydrogen or an ankyl radical.

---

The compounds represented by Formula I are produced by reacting trifluoroguanyl isocyanate with water, ammonia, an amine or an alcohol, at a temperature ranging from about −78° C. to about +50° C. and, generally, at subatmospheric pressure. It is sometimes desirable, however, to use atmospheric or superatmospheric pressure when the charge materials so dictate.

The reactions are preferably, but not necessarily, conducted in the presence of a solvent. Examples of solvents which may be used include ethers such as ethyl ether, dioxane, etc., aromatic hydrocarbons such as benzene, toluene, xylene etc., normally liquid aliphatic hydrocarbons such as hexane, cyclohexane etc., halogenated aromatic and aliphatic hydrocarbons such as chlorobenzene, carbontetrachloride, trichlorofluoromethane etc., and the like. The contact time of the reactants is not critical, however, it is preferred that enough time be utilized so as to accomplish a complete reaction between the charge materials. Since some of the reactions proceed more rapidly than the others, contact times of from about 5 minutes to 24 hours are generally sufficient.

In the production of the compound having the formula (II)  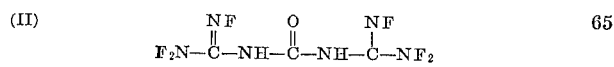

a solvent is necessary. The use of a solvent is necessitated by the fact that a catalyst must be present in order for this compound to be produced under the above specified conditions. That is to say, we have found that the urea compound will not result at a reasonable rate unless the reaction between the trifluoroguanyl isocyanate and water is conducted in the pressure of a catalyst such as trimethyl phosphine oxide, trihexyl phosphine oxide, triphenyl phosphine oxide, 3-methyl-1-phenyl-3-phospholene-1-oxide, pyridine-N-oxide, diphenyl sulfone and the like. A molar ratio of isocyanate to water to catalyst of at least about 2:1:1 may be used. The product which results from the trifluoroguanyl isocyanate/water reaction is a complex of the compound shown in Formula II and the catalyst. The urea compound can be recovered from the complex by reacting it with a material which has a stronger affinity for the catalyst than the urea itself. Examples of such materials include acetic acid, trichloroacetic acid, trifluoroacetic acid, boron trifluoride, stannic chloride and the like.

The trifluoroguanyl isocyanate charge material is a known compound and a method for its preparation is disclosed in copending application Ser. No. 596,050, filed concurrently herewith by Brownlee. Briefly, the isocyanate is produced by reacting perfluoroguanidine with isocyanic acid in the presence of a solvent such as tetramethylene sulfone and a catalyst such as potassium cyanate.

The novel compounds of the instant invention wherein L represents OR or

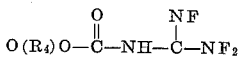

are produced by reactinng the trifluoroguanyl isocyanate with a compound containing at least one hydroxyl group, under the above specified conditions. For example, such hydroxy containing compounds as methanol, ethanol, propanol, isopropanol, n-butanol, t-butanol, isobutanol, pentanol, hexanol phenol, cyclohexanol, allyl alcohol, etc. may be used. Additionally, such polyhydric compounds as ethylene glycol, propylene glycol, phenylene glycol, trimethylene glycol, butanediol-1,4, butanediol-1,3 and the like may be utilized. When the alcohol compounds are utilized, it is obvious that the molar ratio of the isocyanate to the alcohol must be adjusted so that reaction can occur at all the available hydroxyl groups. In other words, a molar ratio of about 1:1 to 5:1 of the isocyanate to the alcohol should be used.

When L represents $NH_2$, $NHR_1$, $NR_2R_3$,

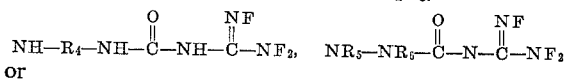

or $$NH-\overset{O}{\underset{\|}{C}}-NH-\overset{NF}{\underset{\|}{C}}-NF_2$$

the trifluoroguanyl isocyanate is reacted with an appropriately substituted nitrogen-containing compound such as ammonia, methyl amine, hexyl amine, cyclohexyl amine, phenyl amine, dimethyl amine, dihexyl amine, diphenyl amine, methyl phenyl amine, hydrazine, methyl hydrazine, dimethyl hydrazine, phenyl hydrazine, methyl phenyl hydrazine, ethylene diamine, phenylene diamine and the like. The isocyanate is reacted with the nitrogen-containing compound, as with the alcohols, in a molar ratio of about 1:1 to 5:1.

The following examples are set forth for purposes of illustration only and are not to be constructed as limitations of the present invention accept as set forth in the appended claims.

EXAMPLE 1

To a suitable reaction vessel, containing a magnetic stirring bar and about 10 molar equivalents of fluorotrichloromethane, is added 1 molar equivalent each of trifluoroguanyl isocyanate and methanol. After stirring the mixture at room temperature for 3 hours, the reactor is cooled to −23° C. and the fluorotrichloromethane is removed by vacuum distillation. Methyl-N-trifluoroguanyl-carbonate remains as a colorless liquid.

*Analysis.*—Calcd. for $C_3H_4N_3F_3O_2$: C, 21.06; H, 2.36; F, 33.31; N, 24.56. Found: C, 20.79; H, 2.25; F, 32.23; N, 23.83.

Following the procedure of Example 1, except that different alcohols and adjusted molar ratios of charge materials are used, various compounds within the scope of the present invention were produced. The results are set forth in Table I, below.

anate and ammonia is added to a suitable reaction vessel containing about 10 molar equivalents of ethyl ether and a magnetic stirring bar. The reaction mixture is stirred for 18 hours at 0° C. Removal of the ethyl ether by vacuum distillation leaves the product as a white solid in 90% yield. Infrared and $F^{19}$ NMR spectra are indicative of the subject 1-trifluoroguanylurea.

Following the procedure of Example 8, except that different nitrogen-containing compounds and different molar ratios of charge materials were used, various com-

TABLE I

| Example | Molar equivalents of trifluoroguanyl isocyanate | Alcohol | Product |
|---|---|---|---|
| 2 | One | Phenol | $NF_2-C(NF)-NH-C(O)-O-C_6H_5$ |
| 3 | One | n-Hexanol | $NF_2-C(NF)-NH-C(O)-O-(CH_2)_5CH_3$ |
| 4 | One | n-Propyl alcohol | $NF_2-C(NF)-NH-C(O)-O-CH_2CH_2CH_3$ |
| 5 | Two | Ethylene glycol | $NF_2-C(NF)-NH-C(O)-O-CH_2-CH_2-O-C(O)-NH-C(NF)-NF_2$ |
| 6 | Two | p-Phenylene glycol | $NF_2-C(NF)-NH-C(O)-O-C_6H_4-O-C(O)-NH-C(NF)-NF_2$ |
| 7 | Two | 1,3,butanediol | $NF_2-C(NF)-NH-C(O)-O-CH_2CH_2CH(CH_3)-O-C(O)-NH-C(NF)-NF_2$ |

EXAMPLE 8

One molar equivalent each of trifluoroguanyl isocy-
pounds within the scope of the present invention were produced. The results are set forth below in Table II.

TABLE II

| Example | Molar equivalents of trifluoroguanyl isocyanate | Nitrogen-containing compound | Product |
|---|---|---|---|
| 9 | One | Methyl amine | $NF_2-C(NF)-NH-C(O)-NHCH_3$ |
| 10 | One | n-Hexyl amine | $NF_2-C(NF)-NH-C(O)-NH(CH_2)_5CH_3$ |
| 11 | One | Phenyl amine | $NF_2-C(NF)-NH-C(O)-NH-C_6H_5$ |
| 12 | One | Diethyl amine | $NF_2-C(NF)-NH-C(O)-N-(C_2H_5)_2$ |
| 13 | One | Methylphenylamine | $NF_2-C(NF)-NH-C(O)-N(CH_3)-C_6H_5$ |
| 14 | Two | Ethylene diamine | $NF_2-C(NF)-NH-C(O)-NH-CH_2CH_2-NH-C(O)-NH-C(NF)-NF_2$ |
| 15 | Two | p-Phenylenediamine | $NF_2-C(NF)-NH-C(O)-NH-C_6H_4-NH-C(O)-NH-C(NF)-NF_2$ |
| 16 | Two | Ammonia | $NF_2-C(NF)-NH-C(O)-NH-C(O)-NH-C(NF)-NF_2$ |
| 17 | Two | Hydrazine | $NF_2-C(NF)-NH-C(O)-NHNH-C(O)-NH-C(NF)-NF_2$ |
| 18 | Two | Methyl hydrazine | $NF_2-C(NF)-NH-C(O)-N(CH_3)-NH-C(O)-NH-C(NF)-NF_2$ |

EXAMPLE 19

To a suitable reaction vessel containing a magnetic stirring bar are added 1 molar equivalent of triphenylphosphine oxide, 1 molar equivalent of water and about 10 molar equivalents of benzene. The reactor is attached to a high vacuum system and 2 molar equivalents of trifluoroguanyl isocyanate are added by vacuum transfer. The mixture is stirred at room temperature for 1 day. Removal of all volatile material on the vacuum line leaves the urea complex as an oily solid residual. The complex is dissolved in about 70 molar equivalents of carbon tetrachloride and then contacted with 9 molar equivalents of trifluoroacetic acid. Cooling to −25° C. causes the urea to separate as a white crystalline solid. Yield: 70%. The product is re-crystallized from benzene/n-hexane. M.P. 95–97° C.

*Analysis.*—Calcd. for $C_3H_2F_6N_6O$: C, 14.29; H, 0.80; F, 45.22; N, 33.34. Found: C, 14.81; H, 0.90; F, 45.10; N, 34.26.

The product is 1,3-bis(trifluoroguanyl)urea.

As mentioned above, the compounds of the instant invention possess properties which make them highly useful as components in rocket propellant fuel compositions. They have a high nitrogen content and a high fluorine content and show no significant impact or electrical sensitivity. The compounds may be used as rocket propellant ingredients by incorporating them into known propellant binders such as polyurethane resins, inadmixture with various oxidizers or fuels, utilizing procedures well known to those skilled in the art. Useful oxidizers include nitric oxide, ammonia perchlorate, ammonia nitrate, etc. Fuels such as aluminum, beryllium, boron and the like may be used. Further details concerning production and formulation of such rocket fuel compositions can be found in U.S. Patent Nos. 2,622,277; 2,646,596; 3,132,978; which patents are hereby incorporated herein by reference.

I claim:

1. a compound having the formula

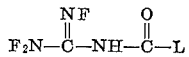

wherein L is selected from the group consisting of an OR radical, an $NH_2$ radical, an $NHR_1$ radical, an $NR_2R_3$ radical, an

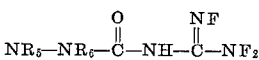

radical, an

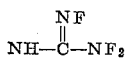

radical, an

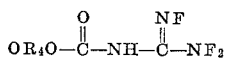

radical, an

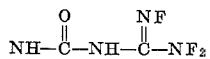

radical and an

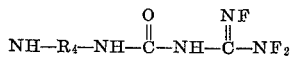

radical, wherein R, $R_1$, $R_2$ and $R_3$ are, individually, selected from the group consisting of an alkyl radical having from 1–6 carbon atoms, inclusive and a phenyl radical, $R_4$ is selected from the group consisting of a lower alkylene radical and a phenylene radical and $R_5$ and $R_6$ are, individually, selected from the group consisting of hydrogen and an alkyl radical having from 1–6 carbon atoms, inclusive.

2. A compound according to claim 1 wherein L is an

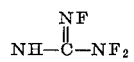

radical.

3. A compound according to claim 1 wherein L is an OR radical.

4. A compound according to claim 1 wherein L is an $NH_2$ radical.

5. A compound according to claim 1 wherein L is an

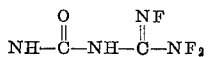

radical.

References Cited

UNITED STATES PATENTS

| | | | |
|---|---|---|---|
| 2,423,643 | 7/1947 | Ericks | 260—553 |
| 3,166,470 | 1/1965 | Nagy | 260—482 |
| 3,346,600 | 10/1967 | Passannante | 260—482 |
| 3,375,259 | 3/1968 | Gibson et al. | 260—553 |

OTHER REFERENCES

Chemical Abstracts, vol. 58, p. 11212 g, citing Kawano et al. May 1963.

JAMES A. PATTEN, Primary Examiner

U.S. Cl. X.R.

149—109; 260—453, 482, 553, 554